US012190509B2

(12) United States Patent
Iozzo et al.

(10) Patent No.: US 12,190,509 B2
(45) Date of Patent: Jan. 7, 2025

(54) SENSING OF PROTEIN-PROTEIN INTERACTION

(71) Applicant: Sanofi, Paris (FR)

(72) Inventors: Yuri Iozzo, Oxford, MA (US); Yu Qiu, Wellesley, MA (US); Yanfeng Zhou, Boxborough, MA (US)

(73) Assignee: Sanofi, Paris (FR)

( * ) Notice: Subject to any disclaimer, the term of this patent is extended or adjusted under 35 U.S.C. 154(b) by 449 days.

(21) Appl. No.: 17/729,735

(22) Filed: Apr. 26, 2022

(65) Prior Publication Data

US 2022/0351375 A1 Nov. 3, 2022

Related U.S. Application Data

(60) Provisional application No. 63/180,990, filed on Apr. 28, 2021.

(51) Int. Cl.
*G06T 7/00* (2017.01)
*G06T 11/60* (2006.01)
(Continued)

(52) U.S. Cl.
CPC ............ *G06T 7/0012* (2013.01); *G06T 11/60* (2013.01); *G06V 10/22* (2022.01); *G06V 20/69* (2022.01);
(Continued)

(58) Field of Classification Search
CPC ................... G06T 7/0012; G06T 11/60; G06T 2207/10056; G06T 2207/20092;
(Continued)

(56) References Cited

U.S. PATENT DOCUMENTS 11,256,994 B1 * 2/2022 Bucher ................. G06V 20/69
2014/0100834 A1 4/2014 Berrondo et al.
(Continued)

FOREIGN PATENT DOCUMENTS

WO WO 2017/155840 9/2017

OTHER PUBLICATIONS

International Search Report and Written Opinion in International Appln. No. PCT/US2022/026351, mailed on Aug. 2, 2022, 16 pages.
(Continued)

*Primary Examiner* — Dhaval V Patel
(74) *Attorney, Agent, or Firm* — Fish & Richardson P.C.

(57) ABSTRACT

A composite image is accessed that comprises a plurality of complex images of samples of a protein-protein complex comprising a first protein and a second protein. The composite image is masked to generate a masked portion and an unmasked portion. A first three-dimensional (3d) shape of the first protein and a second 3d shape of the second protein is accessed. A plurality of docking models are accessed that each define a candidate pose-pair. For each docking model, the first 3d shape, the second 3d shape, and the candidate pose-pair are applied to generate, for the docking model, a corresponding fitment score that describes a goodness-of-fit between the pose-pair and the docking model. One of the docking models is selected as a sensed model for the protein-protein complex based on the fitment scores.

32 Claims, 7 Drawing Sheets

(51) Int. Cl.
*G06V 10/22* (2022.01)
*G06V 20/69* (2022.01)

(52) U.S. Cl.
CPC .............. *G06T 2207/10056* (2013.01); *G06T 2207/20092* (2013.01); *G06T 2210/12* (2013.01)

(58) Field of Classification Search
CPC ..... G06T 2210/12; G06T 11/00; G06V 10/22; G06V 20/69; G06V 10/56; G06V 20/64
See application file for complete search history.

(56) References Cited

U.S. PATENT DOCUMENTS

2019/0062948 A1* 2/2019 Insaidoo .................. G16B 5/00
2022/0188655 A1* 6/2022 Kamuntavicius ...... G16B 50/10

OTHER PUBLICATIONS

Torchala et al., "SwarmDock: a server for flexible protein-protein docking," Bioinformatics, Mar. 15, 2013, 29(6):807-809.
Trellet et al., "Protein-protein modelling using cryo-EM restraints," Structural Bioinformatics, Methods in Molecular Biology, May 1, 2020, 28 pages.
International Preliminary Report on Patentability in International Appln. No. PCT/US2022/026351, mailed on Nov. 9, 2023, 9 pages.

* cited by examiner

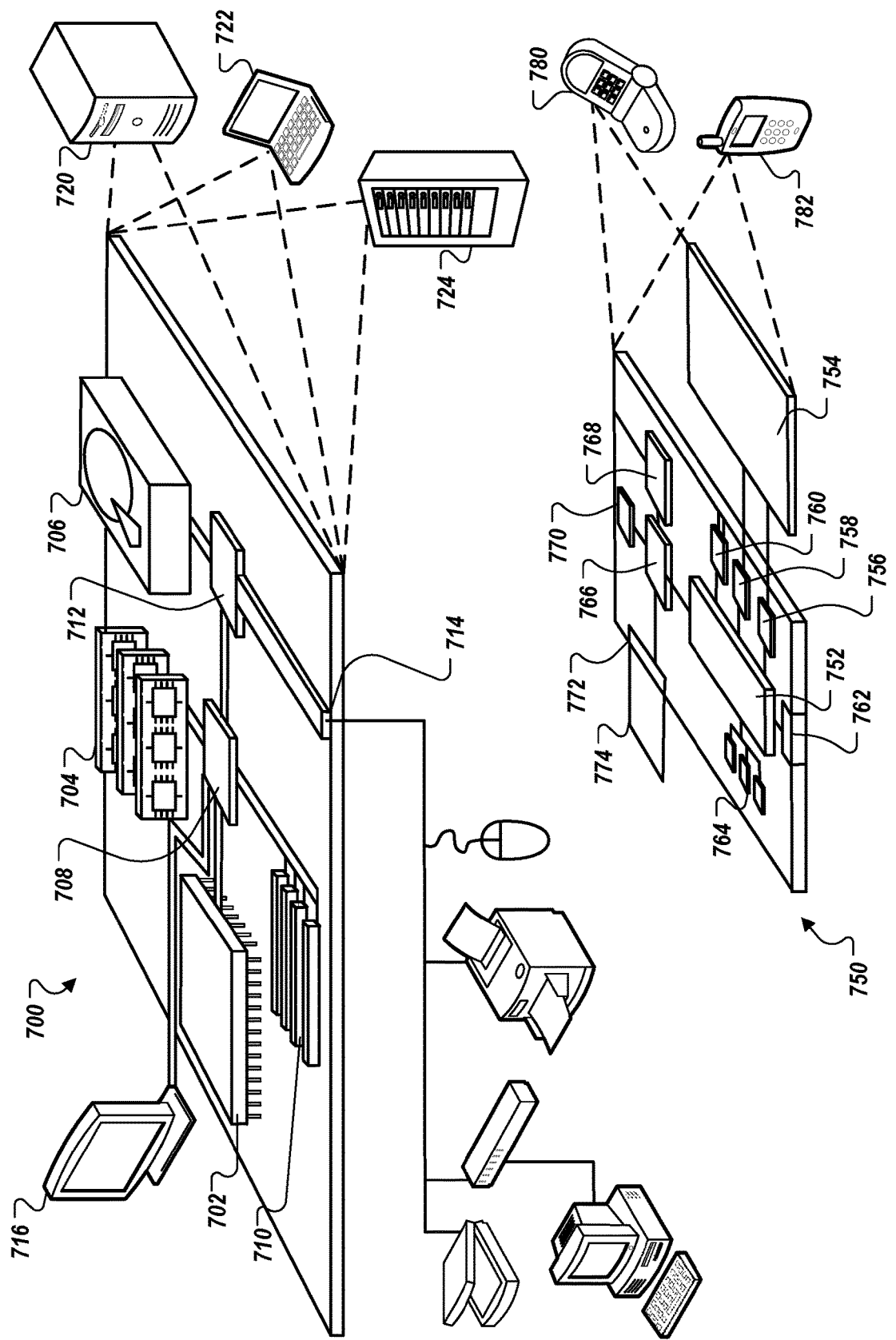

SENSING OF PROTEIN-PROTEIN INTERACTION

CROSS-REFERENCE TO RELATED APPLICATIONS

This application claims priority to U.S. Provisional Patent Application Ser. No. 63/180,990, filed Apr. 28, 2021, the entire contents of this application is herein incorporated by reference.

TECHNICAL FIELD

This document describes technology that uses sensor data to characterize protein-protein binding.

BACKGROUND

Protein-protein interactions (PPIs) are physical contacts of high specificity established between two or more protein molecules as a result of interactions that include electrostatic forces, hydrogen bonding and the hydrophobic effect. Many are physical contacts with molecular associations between chains that occur in a cell or in a living organism in a specific biomolecular context. Proteins rarely act alone as their functions tend to be regulated. Many molecular processes within a cell are carried out by molecular machines that are built from numerous protein components organized by their PPIs.

In immunology, an antigen (Ag) is a molecule or molecular structure, such as may be present on the outside of a pathogen, that can be bound by an antigen-specific antibody or B-cell antigen receptor. The presence of antigens in the body normally triggers an immune response.

SUMMARY

Technology that characterizes protein-protein interactions is described in this document. For example, when developing molecules for clinical or biological use (e.g., drug development), understanding how an antibody interacts with an antigen can be provided with this technology. Cryo-EM imaging of a protein complex can be performed, and the data from the imaging may be processed with a computer system to select a docking model that describes the relative location, orientation, and binding of the two proteins.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for sensing protein-protein complex interactions may include: accessing a composite image that comprises a plurality of complex images of samples of a protein-protein complex comprising a first protein and a second protein. The method also includes accessing a first three-dimensional (3d) shape of the first protein and a second 3d shape of the second protein. The method also includes accessing a plurality of docking models that each define a candidate pose-pair. The method also includes for each docking model, applying the first 3d shape, the second 3d shape, and the candidate pose-pair to generate, for the docking model, a corresponding fitment score that describes a goodness-of-fit between the pose-pair and the docking model. The method also includes and selecting one of the docking models as a sensed model for the protein-protein complex based on the fitment scores. Other embodiments of this aspect include corresponding computer systems, apparatus, and computer programs recorded on one or more computer storage devices, each configured to perform the actions of the methods.

Implementations may include one or more of the following features. The method may include generating the plurality of complex images. Generating the composite image may include extracting sub-images of the protein-protein-complex from the complex images; and orienting and classifying the sub-images. The complex images are cryogenic electron-microcopy (cryoEM) images. Each complex image may include a plurality of pixels each having an address and holding a color value to represent a corresponding portion of the samples of the protein-protein complex. The composite image may include a plurality of pixels each having an address and holding a color value that is an aggregate of the color values of the pixels with a same address in each of the plurality of complex images. The masking of the composite image is performed free of specific user input. The masking of the composite image may include receiving first user input specifying the unmasked portion. Receiving the first user input specifying the unmasked portion may include: generating a bounding box by connecting locations specified by the first user input; and recording the portion of the composite image within the bounding box as the unmasked portion. The first 3d shape is indexed as the first protein and the second 3d shape is indexed as the second protein. The first 3d shape is indexed as a first homologue of the first protein. The second 3d shape is indexed as a second homologue of the second protein. The candidate pose-pair includes a candidate location, candidate orientation, and candidate docking area. The fitment scores are cross-correlation scores between a composite image and the image, generated by projecting docking models onto 2d space. Selecting one of the docking models as a sensed model for the protein-protein complex based on the fitment scores may include: identifying a subset of the docking models based on their corresponding fitment scores by one of a group may include of: i) selecting the docking models with the n highest fitment scores; and ii) selecting all docking models with a fitment score above a threshold m. Selecting one of the docking models as a sensed model for the protein-protein complex may include receiving second user input selecting one of the subset of the docking models as the sensed model. Implementations of the described techniques may include hardware, a method or process, or computer software on a computer-accessible medium.

Implementations can include any, all, or none of the following advantages. This technology can advantageously use cryo-EM imaging results that is easier to obtain. For example, other techniques may require cryo-EM images of protein complex particles from a variety of angles. Unlike those techniques, this document describes techniques that can work with particle images from fewer angles. This is particularly beneficial due to the propensity of some protein complexes to acquire a particular spatial orientation during sample preparation for cryo-EM. This is sometimes referred to as the preferred orientation challenge. Other techniques may require extensive experimentation to find ways to overcome this challenge for a particular protein complex and may still fail. While this technology can avoid the challenge all together. This can lead to processes that can be completed on the order of hours or days, where some other processes take time on the order of weeks or months to complete. In extreme cases this technology can be the only recourse because, unlike other techniques, it works every time if protein particles images are obtained during cryo-EM imaging. Further, this technology can be advantageously configured to incorporate human-user domain expertise in a process that is very quick and requires little time. However, this technology can also advantageously be configured to proceed without any specific human input at the various stages, allowing for less human time and attention to complete the process.

Other features, aspects and potential advantages will be apparent from the accompanying description and figures.

DESCRIPTION OF DRAWINGS

FIG. 7 shows a schematic diagram of an example of a computing device and a mobile computing device.

Like reference symbols in the various drawings indicate like elements

DETAILED DESCRIPTION

Protein-protein interactions can be visualized from, for example, cryo-EM images. A group of cryo-EM image fragments are aggregated into a single composite image, which is then masked to isolate the area in which the two proteins bind. The composite image is then submitted to a group of docking models, which are each scored to identify how well the model describes the docking shown in the composite image. Masking, docking, and scoring can be applied several times (at least a number of times equal to number of proteins forming a PPI) to different parts of the protein complex. Based on this scoring, the best model is identified as the result.

For example, protein-protein interactions can be modeled with cryo-EM images, or other types of images, without the need to use single particle three dimensional reconstruction. Particles of protein complexes are extracted from a group of cryoEM images, followed by alignment, classification, and average. The averaged image of protein complex is then masked to isolate the area of individual proteins or part of the protein complex. The masked image is then submitted to search against a series of two dimensional images continuously projected from 3-D structure or model of individual protein component, like antigen and antibody fragment antigen-binding (Fab). Cross correlations were performed between the masked image (or unmasked image) and 2D projected images to identify the orientation of antigen and/or Fab in the averaged 2D cryoEM image. The protein-protein docking (antigen-Fab docking in example) is performed, using the cross correlation identified interface as constraint of binding sites. In case of Fab-antigen docking, we generate tens of similar models (structure ensembles) of the Fab with diversified conformations of CDRs. Each of the output poses of docking were converted to a series of 2D images by projection. Then in the original 2D cryoEM averaged image and/or the area of the complex is then masked out were then used as a search template and cross correlate against the 2D images from docking results. The docking result giving highest cross correlation scores to masked complex are marked as the best models of the protein-protein complex. In the case of complex with two components, like Fab-antigen, these steps will complete the work. If there are more components to be identified, iterative masking and cross correlation will be performed.

Figure 1:
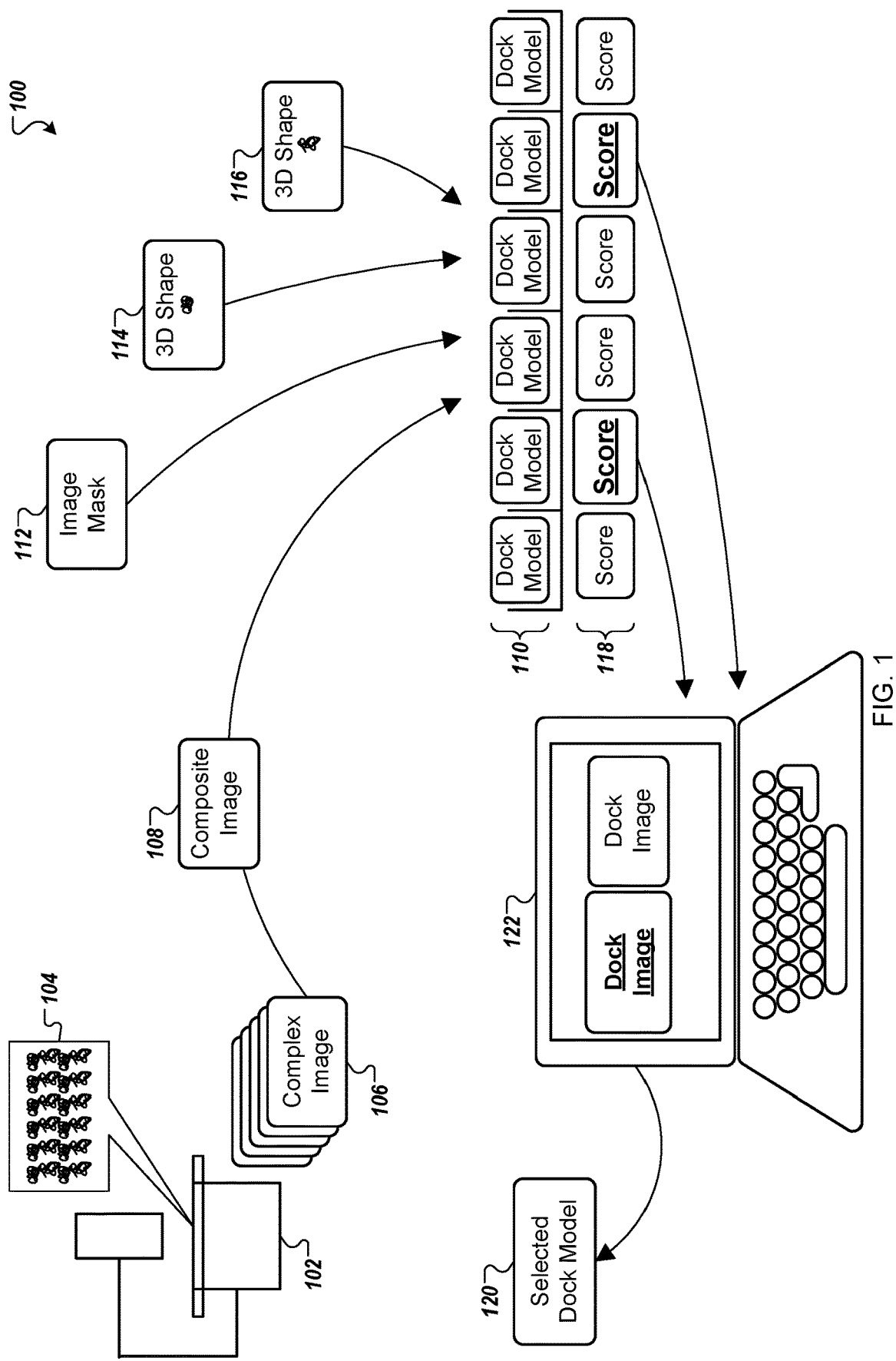
FIG. 1 shows an example system that can sense protein-protein interactions within protein complex.

FIG. 1 shows an example system 100 that can sense protein-protein complex interactions. In the system 100, an imager 102 images samples of a protein-protein complex 104. This can allow for the sensing of the protein-protein complexes 104, allowing the imager 102 to be a sensor that senses docking features of the protein complexes 104.

The imager 102 is an imager capable of sensing physical phenomena of the complexes 104 and to generate data (e.g., digital information) that reflects those physical phenomena. For example, the imager may be a cryogenic electron microscope capable of measuring the complexes 104 by passing a beam of accelerated electrons through the complexes 104 onto a sensor. Perturbations in the beam may be recorded and measured to capture information about the shape, sectional density, etc. To aid in this sensing, the complexes 104 may be held in an ultra-thin ice layer at cryogenic (e.g., very low) temperatures. As will be understood, the complex 104 may include additional proteins and other components.

The imager 102 can generate complex images 106. For example, the imager 102 may generate one set of complex images 106 for each complex 104. In some cases, some of the complex images 106 may be excluded, for example, for capturing complexes 104 at an angle different than the angle of other complexes 104. As will be understood, some cryo-EM processes involve complexes that are bias to a particular orientation in sensing grids, resulting in many, but possibly not all, complexes 104 having the same or similar orientation. In addition, some of the complexes 104 may not be captured in a corresponding image 106. For example, the imaging process may fail to capture the entire complex 104 (e.g., the complex bias to a particular orientation and thus complete imaging of the complex from various orientations is not captured).

The complex images 106 may be aggregated into composite images 108. The composite image 108 may represent an aggregate of the complex images 106 in a format that allows for a single data object that influenced by each complex image, and thus each sensed complex 104.

The process of aggregating the complex images 106 into the composite image can include operations to extract, reorient, and classify elements of the complex images 106 so that the captured images of the complexes 104 may be combined. For example, each of the complex images 106 can be examined to identify portions (e.g., collections of pixels) that show a background value and portions that show a complex 104. Portions that show the complexes 104 can be extracted into a new data file and analyzed with computer-vision to identify features such as unique clusters of values, longest axes of the complex 104, etc. These extracted data can then be rotated to align the features and thus the entire extracted data. For example, the data may be rotated by an angle that causes the cluster of features to have a minimum error or difference to a template image, or so that the longest axis meets a particular angle (e.g. 0 or 90 degrees). Then, the extracted data for each complex 104 can be combined with the expectation that it combines images of the complex 104 that are all in the same orientation and location in the working file.

A group of docking models 110 can each describe one possible model of protein-protein interaction. To characterize the protein-protein interactions of the complexes 104, each docking model may be provided with i) the composite image 108, ii) an image mask 112 that masks out areas of the composite image 108 not expected to include the binding site, iii) a 3D shape 114 that describes, in data, one of the proteins in the complex 104, and iv) a 3D shape 116 that describes, in data, the other of the proteins in the complex 104. More masks and 3D shapes can be used if more than two proteins participate in the PPI. As will be understood, there may be cases in which zero masks are used, and there may be cases in which a sequence of masks may be used to iteratively perform operations.

For each docking model, a score 118 is generated that describes a measure of fitment between the dock model and the data provided to it. Said another way, the score 118 records how similar or different the model 110 is from the data 108, 112-116.

The largest scores 118 can be examined to identify a selected docking model 120. For example, the two highest scores may be identified and rendered on a user interface of a computer 122. Then, one of those docking models may be selected, for example by user input and/or a computer-vision process.

In this example, a two-protein interaction is described. However, it will be understood that interactions with three or more proteins are possible. For example, the processes described here may be repeated for each pair of proteins, or for each pair of proteins that are in contact with each other. These repeated processes may be performed, for example, sequentially or in parallel.

Figure 2:
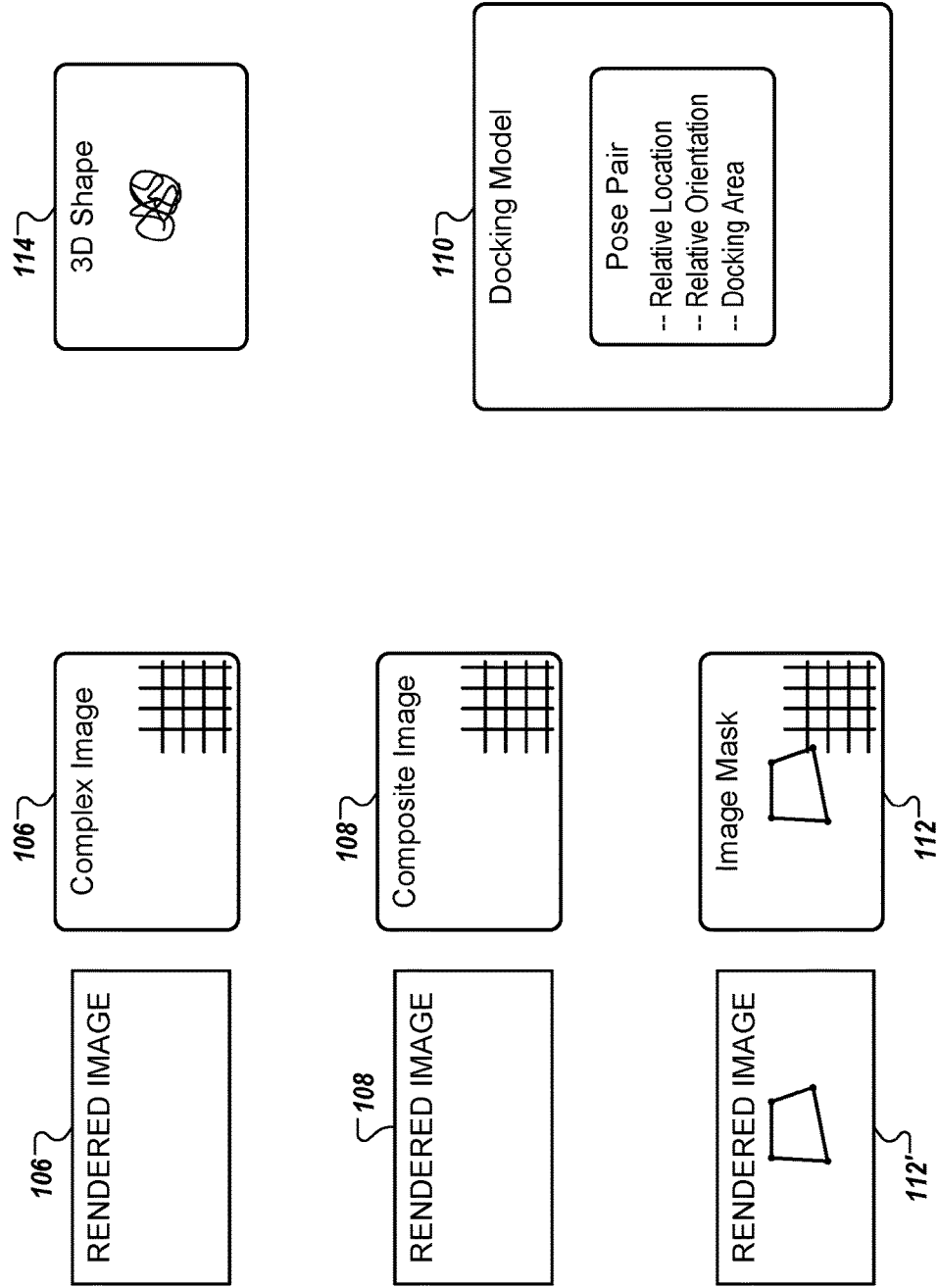
FIG. 2 shows example data that can be used in the sensing of protein-protein complexes.

FIG. 2 shows example data 106-114 that can be used in the sensing of protein-protein complexes. For example, the data 106-114 may include binary digital information stored in computer memory, transmitted over data networks between computing devices, etc. The data can be stored on disk in binary formats and can be rendered on a display screen with colors and shaped defined by the binary data.

The complex images 106 can include cryogenic electron-microcopy (cryo-EM) images. Each image can include a bitmap of pixels—cells arranged in a regular two-dimensional grid addressed by [x][y] to uniquely identify each cell. Each cell may include one or more values to represent a value, for example in an intensity format, a value from zero to one may be used and in a Red Green Blue (RGB) format, in a six-digit hex format, etc. The value of each pixel represents a corresponding portion of the samples of the protein-protein complex. For example, a sensor map of the imagers 102 can receive electrons passing through a portion of a protein-protein complex 104, translate the sensing of to a numeric value, and store that numeric value into the pixel that is similarly addressed in a complex image 106. As will be understood, complex images 106 can be named as such due to recording information about a complex 104.

The composite image 106 can include an aggregation (e.g., a class average) of a group of complex images 106, for example various different complex images 106 of different examples of the same type of protein-protein complex 104 as sensed by the imager 102. Each image can include a bitmap of pixels—cells arranged in a regular two-dimensional grid addressed by [x][y] to uniquely identify each cell. Each cell may include one or more values to represent a color, for example in a Red Green Blue (RGB) format, in a six-digit hex format, etc. The color value of each pixel represents a color value that is an aggregate of the color values of the pixels with a same address in each of the plurality of complex images. For example, for pixel [133] [217] of the composite image 108, the color values of each pixel [133][217] in the group of extracted sub-images of the complex images 106 may be aggregated. This aggregation may be a simple average, a summation, or other aggregate measures that are appropriate for the data format of the pixel values and other technological factors.

The image mask 112 can include information to specify masked and unmasked portions of another image such as the composite image 108. Each image can include a bitmap of pixels—cells arranged in a regular two-dimensional grid addressed by [x][y] to uniquely identify each cell. Each cell may include one or more values to represent a color, for example in a Red Green Blue (RGB) format, in a six-digit hex format, etc. The color value of each pixel represents a color value that is reserved for masked status, unmasked status, etc. For example, black and white colors may be used. Image 112' shows the image mask 112 overlayed over the composite image 108, with a masked section rendered in black and the unmasked section rendered with the pixel values of the unmasked pixels composite image 108. In some configurations, the image mask 112 may include or use a bounding box that describes the edge of a masked or unmasked section. For example, a process (e.g., user input selection, an automated script) can identify a group of vertices, and edges can be created between the vertices to create a polygon to function as the bounding box.

The 3D shape 114 can include information to specify the shape of a single protein or other molecular structure. For example, the 3D shape 114 can include a Protein Data Bank (.pdb) file that records HEADER, TITLE and AUTHOR records; REMARK records; SEQRES records; ATOM records; and HETA™ records. However, other file types and other data models may be used. For example, the 3D shape 114 can include a macromolecular crystallographic Information file (.mmCIF) file that records data in a tag-value format for representing macromolecular structural data.

The 3D shapes 114 and 116 may be selected for use based on their matching one of the two proteins in the protein-protein complex 104. For example, if the first protein is known and has a fully-described 3D shape 114 and the second protein is also known and has a fully described 3D shape 116, those 3D shapes 114 and 116 may be indexed with the name of the proteins and used in these processes. However, in some cases, 3D shapes of homologues of one or both of the proteins may be used. In such cases, structurally similar proteins may be identified as homologues and 3D shapes indexed by the name of the homologues may be accessed.

The docking model 110 includes structured data that defines a possible pose-pair of two proteins in a protein-protein complex. For example, the pose-pair may include relative location, relative orientation, and a docking area. The data may be organized to assume a point on one protein is at a point [0][0][0] in 3D space. Then, the pose may specify a translation (e.g., movement) in terms of [x][y][z] that defines the translation from the origin needed to locate the second protein. The pose may also specify a rotation (e.g., spin) in terms of [x][y][z] that defines the rotation from the orientation of the first protein needed to locate the orientation of the second protein. The docking area may specify one or more surfaces of the proteins that the model specifies as docking surfaces where the two proteins dock or contact. The docking models 110 may be computationally generated according to expected rules that are believed to represent physical protein contact areas. The docking models 110 may be experimentally generated according to experimentation that measures real-world samples of actual protein-protein complexes.

Figure 3:
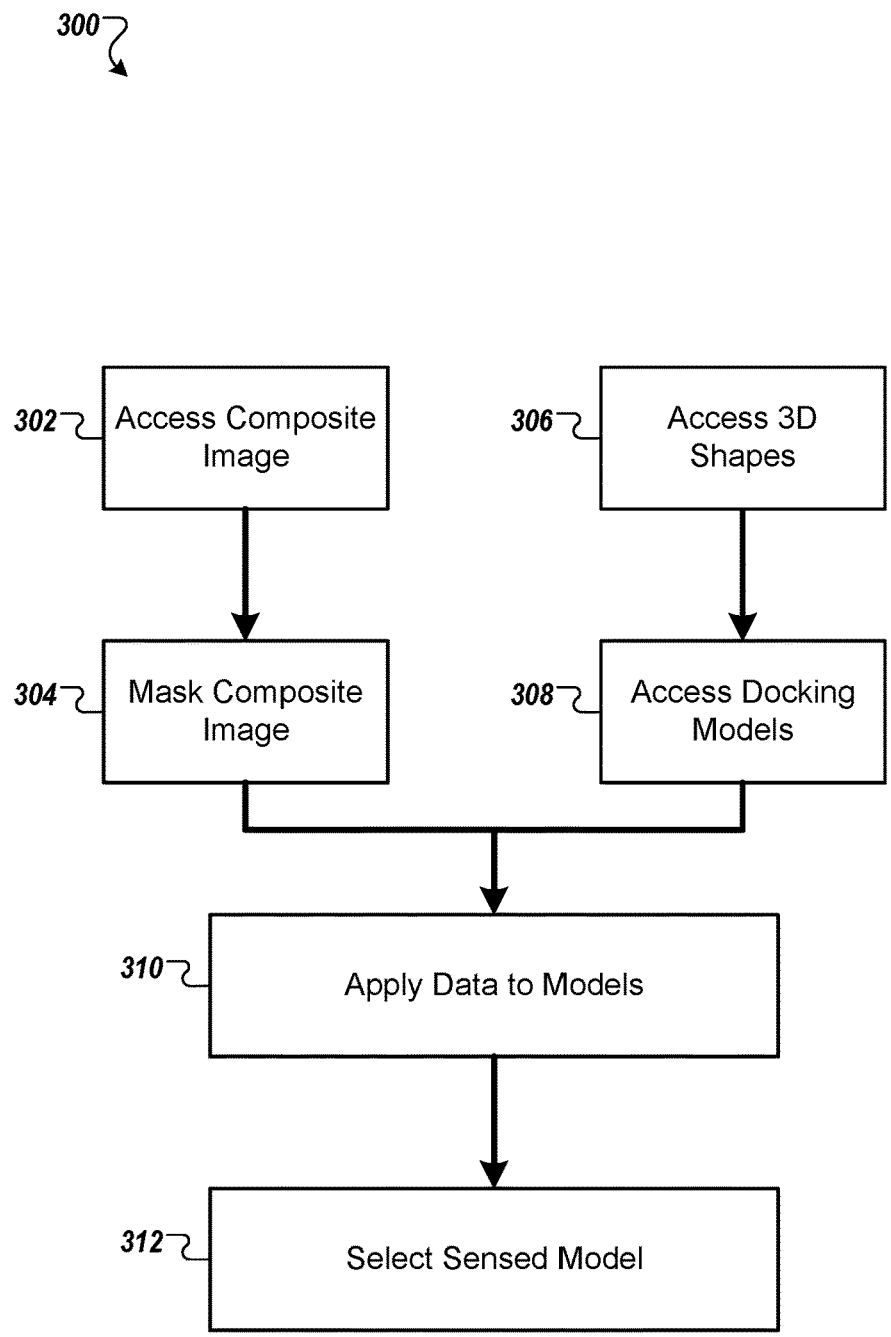
FIG. 3 shows an example process for sensing protein-protein complexes.

FIG. 3 shows an example process 300 for sensing protein-protein complexes. For example, the process 300 can be performed with elements of the system 100, and for clarity the example here will be described in terms of the elements of system 100. However, other systems may be used to perform the process 300 other similar processes.

A composite image is accessed 302 that comprises a plurality of complex images of samples of a protein-protein complex comprising a first protein and a second protein. For example, the computer 122 can access the composite image 108 from an internal memory or from a remote (e.g., cloud hosted) memory services. This may result from, for example, receiving user input requesting analysis of the protein complexes 104 that have been imaged by the imager 102.

The composite image is masked 304 to generate a masked portion and an unmasked portion. For example, the image mask 112 can be applied to the composite image to specify a masked portion and an unmasked portion based on the pixel values stored in the image mask 112. In some configurations, the image mask 112 is generated by an automated script or otherwise free of specific user input. In some cases, computer-vision techniques may be applied to identify features in the composite image 108 and the mask is generated by the automated computer vision process. In some configurations, the image mask 112 is generated using input from a user. In some cases, masking of composite image is not performed. An example of one such process is described later in this document.

A first three-dimensional (3D) shape of the first protein and a second 3D shape of the second protein is accessed 306. For example, the computer 122 can access the 3D shapes 114 and 116 from an internal memory or from a remote (e.g., cloud hosted) memory services. In some cases, the computer 122 may look up the 3D shapes 114 and 116 from a library of 3D shapes by searching on the specific proteins in the protein-protein complex 104 or by searching for one or more homologues of one or both of the proteins or by combining different parts such homologues to create a new homologue.

A plurality of docking models that each define a candidate pose-pair are accessed 308. For example, the computer 122 can access the models 110 from an internal memory or from a remote (e.g., cloud hosted) memory services. In some cases, the computer 122 may look up all possible models 110 that are available. In some cases, the computer 112 may look up a subset of all possible models 110 by querying for only those models that have certain parameters specified based on the technical requirements of the process 300.

For each docking model, the first 3D shape, the second 3D shape, and the candidate pose-pair are applied 310 to generate, for the docking model, a corresponding fitment score that describes a goodness-of-fit between the pose-pair and the docking model. For example, the computer 122 can calculate the fitment score for a single model 110 by supplying the composite image 108, the image mask 112, the 3D shapes 114 and 116, and the single model 110 to a fitment function that performs calculations on this input and returns a numerical value to describe how well the model describes the particular state of the other input data. The computer 122 may repeat this for each model 110.

One of the docking models is selected 312 as a sensed model for the protein-protein complex based on the fitment scores. For example, the computer 122 may select the best model 110 based on the fitment scores of each model 110 and optionally other data, as described later.

Figure 4:
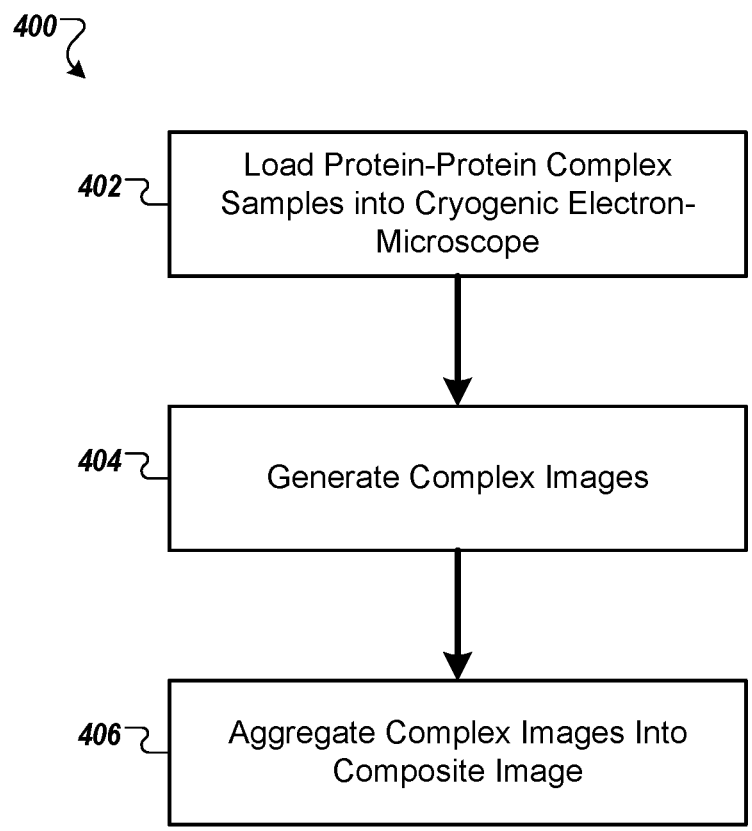
FIG. 4 shows an example process for creating composite images.

FIG. 4 shows an example process 400 for creating composite images, for example as part of pre-processing performed before the accessing 302 of a composite image. For example, the process 400 can be performed with elements of the system 100, and for clarity the example here will be described in terms of the elements of system 100. However, other systems may be used to perform the process 400 other similar processes.

Protein-protein complex samples are loaded 402 into a cryogenic electron-microscope. For example, a human operator and/or automated service machine (e.g., material handling robot) can cryogenically cool the protein-protein complexes 104 and embed them in a medium such as vitreous water. The solution can be applied to a grid-mesh and frozen in a cooling medium such as liquid ethane. The mesh can then be loaded into the imager 102.

A plurality of complex images is generated 404. For example, a human operator, automated service machine, and/or the computer 122 can instruct the imager 102 perform electron microscopy on complexes 104 to generate the complex images 106. Once generated, the complex images 106 can be stored in a computer memory (e.g., internal to the computer 122 or in an external location).

Composite images are generated 406 from the plurality of complex images. For example, for each pixel location, the computer 122 can aggregate pixel values by finding an average and storing the average in a given pixel location across the plurality of pixels of the images 106 to create a single aggregate pixel value, and can store that pixel value in the composite image 108. In some cases, this aggregate can be a weighted average, can exclude outliers, can include median or mode, etc.

In some cases, generating the composite image comprises extracting sub-images of the protein-protein-complex from the complex images; and classifying and orienting the sub-images. For example, the computer 122 can examine each of the images 106 to find pixels areas showing a complex, and can copy those pixel values into a separate sub-image file. In another example, the computer 122 can perform this without use of a separate file, but for clarity the separate file is described. Then, for each separate file, the computer can modify the sub-image so that each sub-image shows the protein in the same direction, scale, intensity, etc. As will be appreciated, this may include one or more image manipulating processes.

Figure 5:
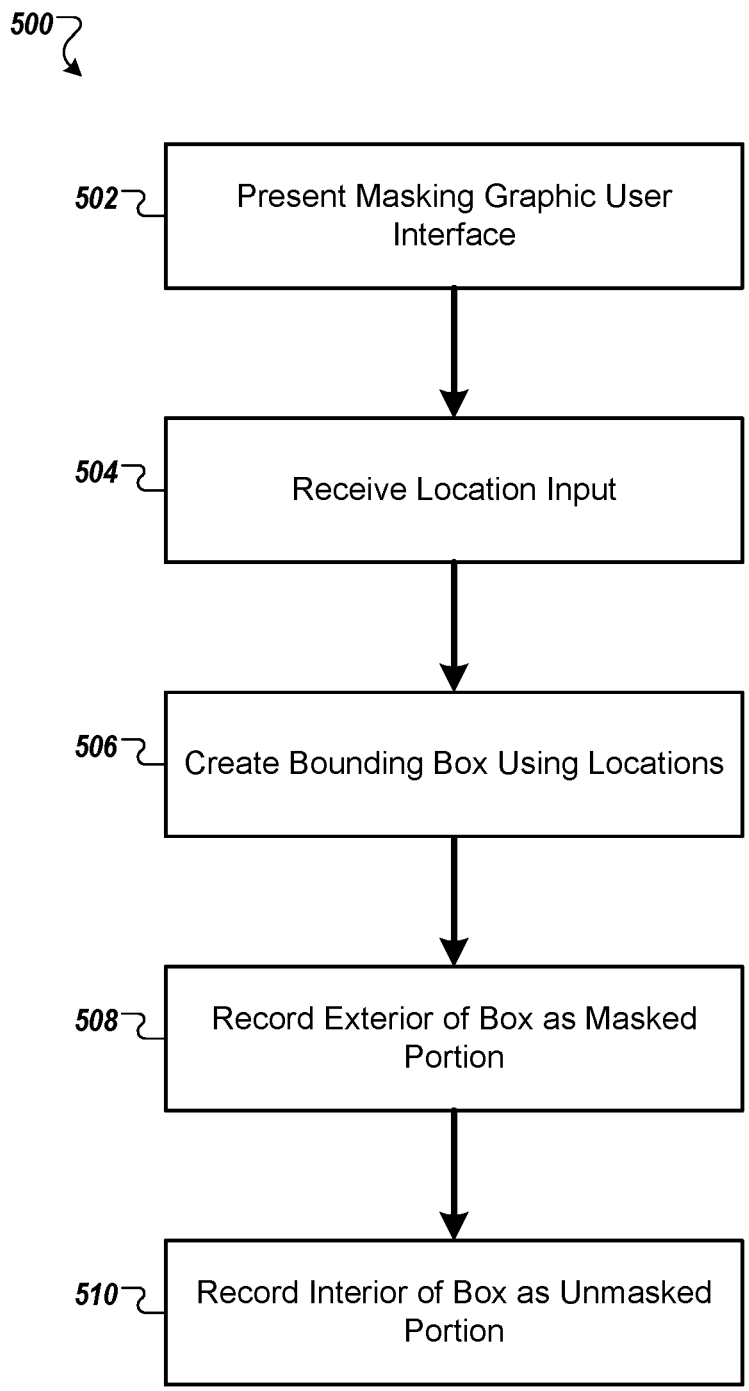
FIG. 5 shows an example process for masking a composite image.

FIG. 5 shows an example process 500 for masking a composite image, for example as part of masking 304 the composite image. For example, the process 500 can be performed with elements of the system 100, and for clarity the example here will be described in terms of the elements of system 100. However, other systems may be used to perform the process 500 other similar processes.

A masking graphic user interface (GUI) is presented 502 to a user. For example, the computer 112 can load a GUI such as an application interface or a webpage on a screen. The screen can render an image of the composite image 108, along with interface elements (e.g., buttons, scroll bars) that receive user input. The user input may be provided by a human operate pressing physical buttons, moving pointing devices, tapping on touchscreens, etc.

First user input is received 504 specifying the unmasked portion. For example, the user may use the interface elements to specify a number (e.g., three, four, six, or nine) of points on the rendered composite image 108. For example, the user may visually identify, using their domain knowledge, an area of the composite image 108 that likely shows the docking area of the protein-protein complex 104 specified by the antigen. The, the user may use a pointing device such as a mouse to identify four vertices of for a bounding box to be drawn around the area they identify.

A bounding box is generated 506 by connecting locations specified by the first user input. For example, the computer 122 can computationally generate line segments that terminate at sequential points identified by the user, including a line segment terminating at the first and last location. This can create a fully connected polygon.

Exterior portions of the box are recorded 508 as a masked portion and interior portions of the box are recorded 510 as an unmasked portion. For example, each pixel fully or partly inside the polygon may be given a color value (e.g., black, white) in the image mask 112, and each pixel fully or partly outside of the polygon may be given a different color value (e.g., white, black).

Figure 6:
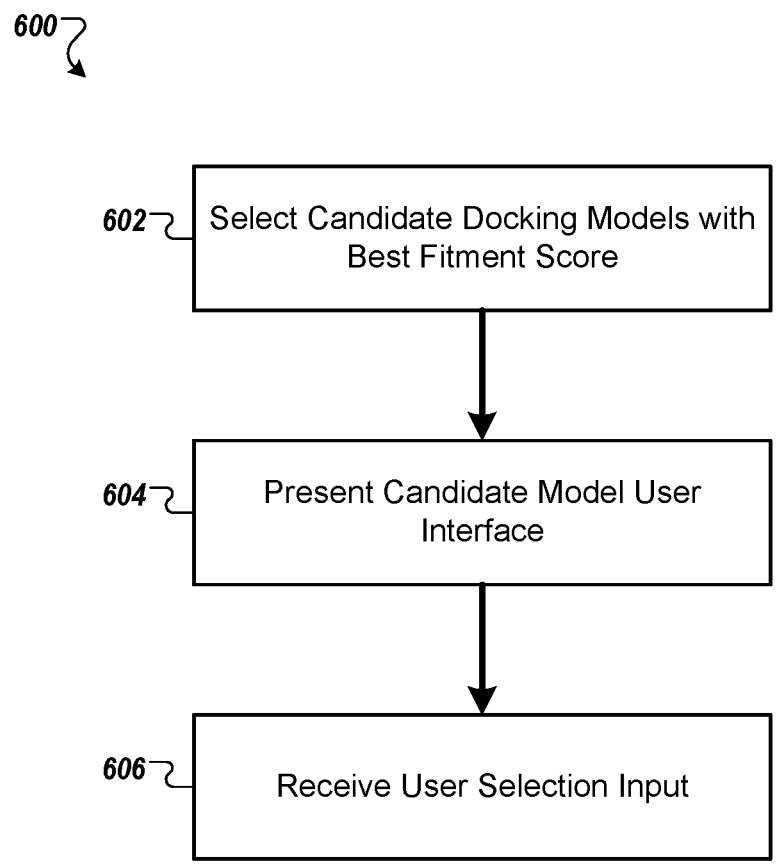
FIG. 6 shows an example process for selecting a sensed model from a group of candidate models.

FIG. 6 shows an example process 600 for selecting a sensed model from a group of candidate models, for example as part selecting the sensed model 312. For example, the process 600 can be performed with elements of the system 100, and for clarity the example here will be described in terms of the elements of system 100. However, other systems may be used to perform the process 600 other similar processes.

Candidate docking models with the best fitment scores are selected 602. For example, when the data is applied to the models 310, a fitment score is calculated for each model. The fitment score can be thought of as a measure of how well the model 110 would predict the arrangement of colors in the composite image 108 given the image mask 112 and 3D shapes 114 and 116 as givens. In some cases, the fitment score is a generated by projecting various orientations of the docking model into a 2D image, and comparing the projected image to the sensed complex images 106. Projections producing the smallest difference to sensed complex may be scored with the best cross-correlation score.

With fitment scores for each model 110, a subset of the models 110 with the best fitment scores are identified. In some cases, these are the top-scored models 110. Those can be found by the computer 122 selecting the docking models 110 with the N (e.g., 5, 10, 20, 100) highest fitment scores. In some cases, these are any model sufficiently predictive. Those can be found by the computer 122 selecting all docking models 110 with a fitment score above a threshold M (e.g., 0.8, 0.9, 0.095, 0.0999 on a scale of 0 to 1).

The candidate models are presented 604 in a user interface and user selection input is received 606 selecting one of the subset of the docking models as the sensed model. For example, the computer 122 can display the subset of models 110 by rendering each dock model and showing the associated score 118, along with a rendering of the composite image 108. The user may use an input device to select one. In some cases, all candidate docking models 110 are shown simultaneously, allowing the user to review all options simultaneously, allowing for more convenient and accurate consideration.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be comprising multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method for sensing protein-protein complex interactions comprises:
   accessing a composite image that comprises a plurality of complex images of samples of a protein-protein complex comprising a first protein and a second protein;
   masking the composite image to generate a masked portion and an unmasked portion;
   accessing a first three-dimensional (3D) shape of the first protein and a second 3D shape of the second protein;
   accessing a plurality of docking models that each define a candidate pose-pair;
   for each docking model, applying the first 3D shape, the second 3D shape, and the candidate pose-pair to generate, for the docking model, a corresponding fitment score that describes a goodness-of-fit between the pose-pair and the docking model; and
   selecting one of the docking models as a sensed model for the protein-protein complex based on the fitment scores.

2. The method of claim 1, the method further comprising generating the plurality of complex images.

3. The method of claim 2, the method further comprising generating the composite image from the plurality of complex images, wherein generating the composite image comprises extracting sub-images of the protein-protein-complex from the complex images; and orienting and classifying the sub-images.

4. The method of claim 1, wherein the complex images are cryogenic electron-microcopy (cryo-EM) images.

5. The method of claim 1, wherein each complex image comprises a plurality of pixels each having an address and holding a color value to represent a corresponding portion of the samples of the protein-protein complex.

6. The method of claim 5, wherein the composite image comprise a plurality of pixels each having an address and holding a color value that is an aggregate of the color values of the pixels with a same address in each of the plurality of complex images.

7. The method of claim 1, wherein the composite image is masked free of specific user input.

8. The method of claim 1, wherein the composite image is masked, the masking comprising receiving first user input specifying the unmasked portion.

9. The method of claim 8, wherein receiving the first user input specifying the unmasked portion comprises:
   generating a bounding box by connecting locations specified by the first user input; and
   recording the portion of the composite image within the bounding box as the unmasked portion.

10. The method of claim 1, wherein the first 3D shape is indexed as the first protein and the second 3D shape is indexed as the second protein.

11. The method of claim 1, wherein the first 3D shape is indexed as a first homologue of the first protein.

12. The method of claim 11, wherein the second 3D shape is indexed as a second homologue of the second protein.

13. The method of claim 1, wherein the candidate pose-pair includes a candidate location, candidate orientation, and candidate docking area.

14. The method of claim 1, wherein the fitment scores are cross-correlation scores generated by projecting docking models onto 2D images.

15. The method of claim 1, wherein selecting one of the docking models as a sensed model for the protein-protein complex based on the fitment scores comprises:
   identifying a subset of the docking models based on their corresponding fitment scores by one of a group consisting of:
   i) selecting the docking models with the N highest fitment scores; and
   ii) selecting all docking models with a fitment score above a threshold M.

16. The method of claim 15, wherein selecting one of the docking models as a sensed model for the protein-protein complex comprises receiving second user input selecting one of the subset of the docking models as the sensed model.

17. A system for sensing protein-protein complex interactions comprises:
   one or more processors; and
   computer memory storing instructions that, when executed by the processors, cause the processors to perform operations comprising:
   accessing a composite image that comprises a plurality of complex images of samples of a protein-protein complex comprising a first protein and a second protein;

accessing a first three-dimensional (3D) shape of the first protein and a second 3D shape of the second protein;

accessing a plurality of docking models that each define a candidate pose-pair;

for each docking model, applying the first 3D shape, the second 3D shape, and the candidate pose-pair to generate, for the docking model, a corresponding fitment score that describes a goodness-of-fit between the pose-pair and the docking model; and selecting one of the docking models as a sensed model for the protein-protein complex based on the fitment scores.

18. The system of claim 17, the operations further comprising generating the plurality of complex images.

19. The system of claim 18, the operations further comprising generating the composite image from the plurality of complex images, wherein generating the composite image comprises extracting sub-images of the protein-protein-complex from the complex images; and orienting and classifying the sub-images.

20. The system of claim 17, wherein the complex images are cryogenic electron-microcopy (cryo-EM) images.

21. The system of claim 17, wherein each complex image comprises a plurality of pixels each having an address and holding a color value to represent a corresponding portion of the samples of the protein-protein complex.

22. The system of claim 21, wherein the composite image comprise a plurality of pixels each having an address and holding a color value that is an aggregate of the color values of the pixels with a same address in each of the plurality of complex images.

23. The system of claim 17, wherein the composite image is masked free of specific user input.

24. The system of claim 17, wherein the composite image is masked, the masking comprising receiving first user input specifying the unmasked portion.

25. The system of claim 24, wherein receiving the first user input specifying the unmasked portion comprises:

generating a bounding box by connecting locations specified by the first user input; and recording the portion of the composite image within the bounding box as the unmasked portion.

26. The system of claim 17, wherein the first 3D shape is indexed as the first protein and the second 3D shape is indexed as the second protein.

27. The system of claim 17, wherein the first 3D shape is indexed as a first homologue of the first protein.

28. The system of claim 17, wherein the second 3D shape is indexed as a second homologue of the second protein.

29. The system of claim 17, wherein the candidate pose-pair includes a candidate location, candidate orientation, and candidate docking area.

30. The system of claim 17, wherein the fitment scores are cross-correlation scores generated by projecting docking models onto 2D images.

31. The system of claim 17, wherein selecting one of the docking models as a sensed model for the protein-protein complex based on the fitment scores comprises:

identifying a subset of the docking models based on their corresponding fitment scores by one of a group consisting of:

i) selecting the docking models with the N highest fitment scores; and ii) selecting all docking models with a fitment score above a threshold M.

32. The system of claim 31, wherein selecting one of the docking models as a sensed model for the protein-protein complex comprises receiving second user input selecting one of the subset of the docking models as the sensed model.

* * * * *